United States Patent
Stevenson et al.

(10) Patent No.: US 6,852,788 B2
(45) Date of Patent: Feb. 8, 2005

(54) REINFORCEMENT COMPOSITION FOR ROTATIONAL MOLDING

(75) Inventors: Michael J. Stevenson, 1200 Soldier Pass Rd., Sedona, AZ (US) 86336; Robert Alan Reeves, Cottonwood, AZ (US)

(73) Assignee: Michael J. Stevenson, Sedona, AZ (US)

( * ) Notice: Subject to any disclaimer, the term of this patent is extended or adjusted under 35 U.S.C. 154(b) by 320 days.

(21) Appl. No.: 10/002,590

(22) Filed: Dec. 5, 2001

(65) Prior Publication Data

US 2003/0102600 A1 Jun. 5, 2003

(51) Int. Cl.⁷ ............................................... C08K 5/01
(52) U.S. Cl. ..................................................... 524/474
(58) Field of Search ......................................... 524/474

(56) References Cited

U.S. PATENT DOCUMENTS 4,925,880 A  *  5/1990  Stein ............................ 521/98

* cited by examiner

*Primary Examiner*—Edward J. Cain
(74) *Attorney, Agent, or Firm*—Robert E Strauss

(57) ABSTRACT

A mixture of a carrier and binder component and polymer powders is provided as a molding composition for sealing rotational molds or for reinforcing selected areas of rotationally molded parts. The carrier and binder component can be very low density polyethylene, petroleum jelly, hydrocarbon wax, hydrocarbon tackifier, or mixtures thereof, and the polymer powders are thermoplastics having a low melt index. The molding composition is applied to selected areas of the rotational mold, such as to the mating flanges of the mold halves to seal the parting line of the mold, or to areas within the mold where it is desired to have reinforced regions of greater wall thickness, such as ribs or bosses.

19 Claims, No Drawings

REINFORCEMENT COMPOSITION FOR ROTATIONAL MOLDING

BACKGROUND OF THE INVENTION

1. Field of Invention

This invention relates to rotational molding, in particular, to a method and molding composition to reinforce surfaces of parts formed by rotational molding.

2. Brief Statement of the Prior Art

Hollow-form plastic parts such as outdoor signs, tanks and containers are commonly formed by rotational molding. In rotational molding, polymer particles are charged to a rotational mold which is closed and heated to the melt temperature of the polymer particles while rotating the mold about its major and minor axes for a time sufficient to form the molded part. The mold is then cooled to a demolding temperature, opened and the molded product is ejected. A limitation of this molding process is that the walls of rotationally molded parts are substantially uniform in thickness, precluding formation of parts with integrally formed regions of greater wall thickness such as ribs, bosses and fillets. Also, the rotational molds are subjected to repeated thermal cycling and heavy usage which frequently distorts the sealing flanges of the mold, causing the mold to fail to seal tightly, resulting in loss of resin through cracks in the parting line of the mold.

OBJECTIVES OF THE INVENTION

It is an objective of this invention to provide a molding composition and a method for its use to provide integral reinforcement of rotationally molded parts.

It is also an objective of this invention to provide a molding composition and a method for its use to seal parting lines of molds used in rotational molding.

It is a further objective of this invention to provide a molding composition and method for its use to increase the wall thickness of selected areas of rotationally molded parts.

It is also an objective of this invention to provide a molding composition and method to form integral ribs and bosses on walls of rotationally molded parts.

Other and related objectives will be apparent from the following description of the invention.

BRIEF DESCRIPTION OF THE INVENTION

The molding composition of the invention is a mixture of a carrier and binder component and polymer powder. The carrier and binder component can be very low density polyethylene and the polymer powder is typically polyethylene having a low melt index, however, other polymers can be chosen to match closely to the properties of the base polymer used in forming the part. The method of the invention comprises application of the molding composition to selected areas of the rotational mold such as to the mating flanges of the mold halves to seal the parting line of the mold, or to areas within the mold where it is desired to have reinforced regions of greater wall thickness, such as integral ribs or bosses.

DESCRIPTION OF PREFERRED EMBODIMENTS

This invention comprises a molding composition and method for its use to form integral regions of increased wall thickness in rotationally molded parts such as ribs or bosses on the inside wall of the molded part, or protrusions such as handles or tabs on the outside wall of the molded part. In another application, the molding composition can be used to form, on the parting line of a rotational mold, a sealing gasket which prevents loss of resin during molding.

The molding composition which is useful in the invention is a mixture of a semi-solid carrier and binder component in an amount from 1 to about 45 weight percent and thermoplastic polymer powder in an amount from 99 to about 55 weight percent.

The polymer powder can have a size range from about 5 microns to 400 (about 40 mesh) and preferably has a low melt index, less than 30 grams/minute, preferably in the range from 0 to 10. The low melt index ensures that the molding composition will stay in place and not flow from the applied region during molding of the part. The polymer powder is selected for the application to match the properties of the base polymer, e.g., to match shrinkage, impact and tensile strengths, toughness, etc. Usually the matching will be based on using the same type of polymer as the base polymer used for molding the part such as using polypropylene powder when molding polypropylene parts and polyethylene when molding polyethylene parts. Examples of polymers which can be used include high density, linear low density, low density, cross-linkable polyethylene, metallocene modified polyethylene, ethylene-vinyl acetate copolymer, ethylene-butyl acrylate copolymer, polypropylene, Nylon, polycarbonate, polyesters, polyvinyl chloride.

In some applications, however, it may be desirable that the plug, rib or protrusion from the molding composition have greater physical properties, e.g., greater strength or toughness. In such applications, powders of a compatible polymer with greater physical properties than those of the base polymer can be selected. In some applications, very high or ultra high molecular weight polyethylene can be used to enhance the physical properties of the plug, rib or protrusion. It is preferable to also include a thermal conductor such as copper or aluminum powders or metal coated glass beads in amounts from 3 to 20 weight percent of the ultra high molecular weight polyethylene to enhance curing of the molding composition.

Alternatively, cross-linkable polyethylene powder could be used admixed with a cross linking agent to achieve high strength of the molded composition.

The semi-solid carrier and binder component can be selected from the following ingredients: very low density polyolefins, petroleum jelly, hydrocarbon waxes, hydrocarbon tackifiers, or combinations of these ingredients.

Very Low density polyethylene is the preferred carrier and binder component, however, in some applications, petroleum jelly can be used in amounts up to about 50 weight percent of the carrier and binder component to soften the molding composition and render it more pliable for ease in conforming to the contours of the rotational mold. Very low density polyethylene (density from 0.85 to 0.90 grams/cubic centimeters) is very suitable as it can accept maximum loading of the selected polymer powder.

Hydrocarbon waxes can also be used as the carrier and binder component. Examples of suitable waxes include natural waxes, paraffin wax, synthetic wax, microcrystalline wax, etc. Microcrystalline waxes are refined petroleum waxes that have been crystallized from solvents used to extract wax from highly paraffinic petroleum stocks.

Paraffin wax comprises chiefly n-paraffin hydrocarbons having from 16 to 38 carbons with limited quantities of branched chain paraffins, monocyclic and polycyclic paraffins.

Synthetic hydrocarbon waxes are obtained by the polymerization and copolymerization of hydrocarbon olefins such as ethylene and propylene. Typically these synthetic waxes have molecular weights from 400 to about 3,000 with a narrow molecular weight distribution.

Useful hydrocarbon tackifiers should have a softening temperature less than the melting temperature of the polymer particles, which for polyethylene particles should be less than 250 degrees F. Useful tackifiers include polyacrylic acid polyacrylates, polyurethanes, poly(vinyl)acetate and copolymers and mixtures thereof. Particularly preferred tackifiers are hydrocarbon resins such as aliphatic or cycloaliphatic petroleum resins from five carbon monomers containing minor amounts of aromatics, synthetic terpene resins, chlorinated polyolefins and hydrogenated rosin and rosin esters.

The hydrocarbon waxes and tackifiers should be of light color to avoid staining the polymer particles, should have high heat and ultraviolet light stability and be soluble in hydrocarbon solvents or be readily emulsifiable in water for ease of mixing with the polymer particles as described hereinafter.

The amount of the carrier and binder component used in the molding composition can be varied, depending on the application. Since the carrier and binder component will lessen the physical properties of the plug, rib or protrusion formed from the molding composition, it is desirable to use the least amount of carrier and binder component which is compatible with the intended method of application. When used as a pliable solid to fill a mold cavity, the carrier and binder component can be used in amounts from 15 to 45 weight percent of molding composition and the thermoplastic powder can be from 85 to 55 weight percent of the molding composition.

In some applications, the molding composition can be used as a preform which is laid into the rotational mold. In these applications, the amount of carrier and binder component in the preform can be in the range from 1 to about 12 weight percent and the amount of thermoplastic polymer powder can be from 99 to about 88 weight percent of the preform molding composition. When using such low amounts of carrier and binder component, it is preferable to mix the carrier and binder component and polymer powder and then compression mold the molding composition into the shape of the desired preform.

It is preferred to dissolve the carrier and binder component in a volatile solvent, or emulsify the component in water using a surfactant as needed to achieve intimate mixing and contacting with the polymer particles. The solvent or water can then be evaporated to obtain a dry mixture of the carrier and binder component which is suitable for compression molding into a preform which can be loaded into the rotational mold. Solutions and aqueous emulsions with solids contents from 35 to 85 weight percent can be used, preferably the maximum solids content which still retains stability and ease of mixing are used to minimize the amount of solvent or water which must be evaporated.

In other applications, the molding composition can be supplied as a die cut preform by including a low melting point paraffin or polyethylene wax in the carrier and binder component in an amount sufficient to gel or solidify the molding composition and permit die cutting, typically the amount of wax for this purpose can be from 10 to 15 weight percent of carrier and binder component.

In some applications the molding composition can also be loaded with from 1 to 10 weight percent of reinforcement fibers such as chopped fibers of glass, carbon, polyester.

Included in the molding composition to form a cellular or foamed region in the molded part. Various chemical or physical foaming agents which are conventionally used in molding resins can be used such as azodicarbonamide and activated and modified azodicarbonamide, p-toluenesulfonylsemicarbazide, and other proprietary endothermic and exothermic foaming agents. These foaming agents are used at the supplier's recommended concentrations, usually from 0.25 to about 5 weight percent of the molding composition.

Various other, conventional additives can also be incorporated into the molding composition, e.g., pigments and dyes which are conventionally used with molding resins can be used to duplicate the color of the resin used for the molded part, thereby visually blending the molded composition into the part. Preferably, these additives are used in the identical manner as in the molded resin to duplicate faithfully the properties and appearance of the molded part.

The molding composition is applied to selected areas of a rotational mold while the mold is at or near its demolding temperature, i.e., the temperature at which molded parts are ejected during the molding cycle. Typically, the optimum temperature for application of the molding composition is from 70 to about 150 degrees F.

When applied to seal the parting line of a worn or damaged mold, the molding composition is worked into a rope-like configuration and flattened against the sealing face of a mold in the region where a gap exists in the parting line of the mold. Alternatively, the molding composition can be packed into a caulking container and applied with a caulking gun. The molding composition is applied with a thickness from 0.012 to 0.25 inch, depending on the dimensions of the gap between the sealing edges of the mold. Preferably, a parting agent is applied to the sealing face before application of the molding composition. During the molding cycle, the molding composition forms a gasket which prevents loss of molding resin from the interior of the mold. Preferably, the bead of the molding composition is applied along the periphery of the mating flanges of the mold halves, avoiding the possibility that the molding composition will merge into the molded part, to avoid the necessity to cosmetically repair the part in the event that the molding composition does not have the same colorant as the base polymer. If the molding composition merges into the part, it will become integral with the wall of the molded part. The ejected part will have some flashing which can be readily trimmed from its exterior surface.

When the molding composition is used to reinforce selected wall areas of a molded part, it can be worked into a dough-like consistency and hand applied to selected areas of the inside walls of the mold. The strength and stiffness of a part wall can be increased by applying beads of the molding composition along the interior wall of the mold, either by hand layup or by use of a chalking gun applicator. Fillets or corners of the mold can be partially or completely filled with the molding composition to reinforce stress regions of the molded part. In some applications it is desirable to provide sites for attachment of extraneous elements such as hardware to a molded part. For this use, the molding composition is laid up to form a thick protrusion on the wall at the attachment site area. The thickness of the protrusion can be from 0.125 to about one inch, sufficient to form a boss on the molded part which can be drilled and tapped for attachment of hardware.

When the molding composition is applied to the internal surface of a rotational mold, it preferable to use a pressure sensitive adhesive which has a tack temperature range from 90 to about 275 degrees F. to immobilize the molding composition on the wall of the rotational mold. The adhesive can be applied to the rotational mold wall by spraying or by application from a transfer sheet, or can be applied to the surface of the molding composition preform before it is laid against the rotational mold surface. The adhesive should have a transition temperature at or near the maximum molding temperature, typically from 275 to 320 degrees F. to separate from the rotational mold wall and become incorporated into the molded part.

The molding composition can also be used for repair or modification of molded parts, such as tanks which have cracks or holes in the tank walls such as damaged, used parts or vent holes in newly molded parts. In these applications, the open area of the wall is closed with the molding composition, using if necessary a fiberglass mat or cloth across the open area. The part wall surrounding the worked area is then heated to about 350 degrees F., fusing the molding composition into the wall of the part.

The heating can be accomplished using a suitable radiant source such as an open flame or a high temperature electrical heater, e.g., an infrared heater. The heating step is practiced to apply heat locally to the treated surface of the molded part sufficiently to fuse the molding composition into the wall of the molded part, a condition which is reached when the molding composition surface appears to be clear of any cloudiness. Thereafter, the molded part is cooled to ambient temperature.

The invention is further described and illustrated by the following examples:

EXAMPLE 1

The invention is used to provide an internal boss on the inside wall of a kayak that is formed by rotational molding. The kayak is approximately 84 inches long and 24 inches in width at its widest region. Metal handles are to be attached at two locations on the upper sidewall of the kayak. The molding composition is laid up at a thickness of 1.5 inches at selected areas of the inside wall of the mold corresponding to the desired locations for attachment of the handles to the molded part. The molding composition is a mixture of 30 weight percent very low density (0.88 g/cc) polyethylene and 70 weight percent high density polyethylene having a melt index less than 20. The mold is charged with 35 mesh polyethylene, closed and processed through an otherwise conventional molding cycle. The molded part has internal bosses at the selected attachment sites which are readily drilled and tapped to accept screws which anchor handles to the kayak.

EXAMPLE 2

A rotational mold formed of two halves has a damaged sealing face which has a gap of approximately 0.25 inch at portions along its parting line and is not suitable for continued use because of the loss of molding resin through the gap along the parting line of the mold. The damaged portion of the sealing face is coated with a silicon mold release and the molding composition is applied as a bead approximately 0.375 inch in diameter on the damaged portion of the sealing face while the mold is at a demolding temperature (120 degrees F.). The mold is charged with polyethylene molding resin having a size range passing a 35 mesh screen and a conventional rotational molding cycle is performed. The parting line remains sealed throughout the molding operation, and none of the molding resin is lost through the parting line of the mold. At the regions where the mold was sealed with the molding composition, the ejected part has slight flashing which is readily removed and polished to obtain a part identical to that obtained from an undamaged mold.

EXAMPLE 3

A tank which was rotationally molded with polyethylene resin has a puncture approximately 0.4 inch in diameter in its side wall. The tank wall is cleaned and sanded in the punctured area and the tank is heated to about 120 degrees F. The molding composition of the invention is extruded into the puncture and applied as a thin layer over the entire punctured area. The tank wall is then heated with an infrared heating element until the applied molding composition takes on a clear cast or appearance. The tank is cooled to ambient temperature and it is observed that the puncture has been sealed and the repaired area is smooth and undistinguishable from the remainder of the tank wall.

EXAMPLE 4

A hollow form container approximately eight by six inches with a thickness of about two inches is to be formed with a handle on its upper end and solid legs extending from its lower end. It is also desired to form two solid bosses, each one inch in diameter, extending across the interior of the container approximately one inch above the bottom wall. Each half of the rotational mold is formed with a raised rectangular land area along the upper edge of the mold having a raised, rectangular rib to form a recess in the upper edge of the container for the handle. Recesses ⅜ inch wide by ½ inch deep are cut into opposite corners of the bottom wall of each half of the mold. Each half of the rotational mold is also machined to form two spaced-apart, circular recesses that are ⅛ inch deep and one inch in diameter approximately one inch above the bottom wall. These recesses are located symmetrically in the mold halves such that when closed, the recesses in the opposite walls of the mold are in alignment.

A handle is formed from a molding composition comprising 66 weight percent high density polyethylene and 17 weight percent very low density polyethylene and 17 weight percent polyethylene wax (210 melt point) by die cutting a ⅜ inch thick slab of the molding composition. Four cylindrical plugs, each one inch in diameter are die cut from a one-half inch thick slab of a molding composition comprising 46 weight percent ultra-high density polyethylene and 46 weight percent very low density polyethylene and 8 weight percent copper powder.

The die cut handle is placed on the land of one half of the rotational mold, surrounding the raised rib and the cylindrical plugs are placed in the circular recesses of each half of the mold. The recesses at opposite corners of the bottom walls of the mold halves are filled with plugs of the same molding composition used for the handle. The mold is charged with 35 mesh high density polyethylene, closed and heated to and maintained at 450 degrees F. for fifteen minutes while rotating the mold about its major and minor axes. The mold is cooled to 120 degrees F., and the part is removed. The part has an integral solid form handle and solid form legs which are integral with the bottom wall of the part. The part is cut open to reveal that the cylindrical plugs bonded together and to the container, forming two internal cylindrical bosses that extend between the opposite sidewalls of the container and that are integral with the container walls.

It is also desired to form a vertical rib within the container and extending between the opposite sidewalls of the container. To locate the rib, a 3/16 inch wide groove is milled along the vertical centerline of each mold half, two inches long and 1/8 inch deep. The experiment is repeated and a preform of the same molding composition as used for the cylindrical plugs is placed in the vertical grooves, extending across the mold cavity. When the molded part is cut open, it is observed to have an integral internal rib that extends between the opposite sidewalls of the container.

The invention has been described with reference to the illustrated and presently preferred embodiment. It is not intended that the invention be unduly limited by this disclosure of the preferred embodiment. Instead, it is intended that the invention be defined by the method steps and ingredients, and their obvious equivalents, set forth in the following claims.

What is claimed is:

1. A molding composition consisting essentially of:
   a. from 55 to 85 weight percent of thermoplastic polymer particles having a melt index less than 30 and a particle size no greater than about 40 mesh; and
   b. from 15 to 45 weight percent of polyethylene having a density less than 0.9 grams/cubic centimeters.

2. A molding composition consisting essentially of:
   a. from 55 to 85 weight percent of thermoplastic polymer particles having a melt index less than 30 and a particle size no greater than about 40 mesh; and
   b. from 15 to 45 weight percent of petroleum jelly.

3. The molding composition claim 1 or 2 including from 5 to 10 weight percent of reinforcement fibers.

4. The molding composition of claim 1 or 2 wherein the carrier and tackifier component includes a low melting point hydrocarbon wax.

5. The method of rotational molding wherein hollow-form plastic parts are formed by charging thermoplastic polymer particles to a rotational mold comprising at least two mold parts having sealing faces which mate together on a parting line to form a closed internal mold cavity, closing and heating the mold to the molding temperature of the polyolefin while rotating the mold about its major and minor axes for a time sufficient to form the molded part, cooling the mold to a demolding temperature, opening the mold and ejecting the molded part, the improvement which comprises:
   applying on a selected internal area of the mold parts at a temperature from 90 to 190 degrees F. prior to closing and heating the mold, a molding composition consisting essentially of: from 55 to 85 weight percent of thermoplastic polymer particles having a melt index less than 30 and a particle size no greater than about 40 mesh; and a carrier and binder component selected from the group consisting of petroleum jelly, very low density polyolefins, hydrocarbon waxes, hydrocarbon tackifiers and mixtures thereof in an amount from 15 to 45 weight percent of the composition.

6. The method of claim 5 wherein a plug of the molding composition is applied to a selected wall area of the mold and the plug cures into an integral, interior boss on the molded part during the heating and rotating of the mold.

7. The method of claim 5 wherein a bead of the molding composition is applied to a selected wall area of the mold and the bead cures into an integral, interior rib on the molded part during the heating and rotating of the mold.

8. The method of claim 5 wherein the mold has at least one recess in its wall and the molding composition is applied to fill the recess and cures into an integral, exterior protrusion on the molded part.

9. The method of claim 5 wherein the molding composition is formed into a solid preform and the solid preform is applied to a selected interior surface of the mold.

10. The method of claim 9 including the step of applying a pressure sensitive adhesive to the selected interior surface of the mold to immobilize the preform on the wall of the mold during the heating and rotating of the mold.

11. The method of rotational molding wherein hollow-form plastic parts are formed by charging thermoplastic polymer particles to a rotational mold comprising at least two mold parts having sealing faces which mate together on a parting line to form a closed internal mold cavity, closing and heating the mold to the molding temperature of the polyolefin while rotating the mold about its major and minor axes for a time sufficient to form the molded part, cooling the mold to a demolding temperature, opening the mold and ejecting the molded part and wherein the sealing faces of the mold mate with a separation gap along at least a portion of their sealing faces, the improvement which comprises:
   applying to said portion of the sealing faces of said mold parts prior to closing and heating the mold, a molding composition consisting essentially of: from 55 to 85 weight percent of thermoplastic polymer particles having a melt index less than 30 and a particle size no greater than about 40 mesh; and a carrier and binder component selected from the group consisting of petroleum jelly, very low density polyolefins, hydrocarbon waxes, hydrocarbon tackifiers and mixtures thereof in an amount from 15 to 45 weight percent of the composition to close said gap when said mold is closed.

12. The method of repairing a structural void in a rotationally molded part having an open area in the wall thereof which comprises:
   a. applying a plug of a molding composition to said wall to close said open area, said molding composition consisting essentially of: from 55 to 85 weight percent of thermoplastic polymer particles having a melt index less than 30 and a particle size no greater than about 40 mesh; and a carrier and binder component selected from the group consisting of petroleum jelly, very low density polyolefins, hydrocarbon waxes, hydrocarbon tackifiers and mixtures thereof in an amount from 15 to 45 weight percent of the composition; and
   b. heating said plug and the wall surrounding said plug to a temperature of about 350 degrees F. to fuse said plug of molding composition into the wall of said part.

13. The method of claim 5, 11 or 12 wherein polyethylene having a density less than 0.9 grams/cubic centimeters is used as the carrier and binder component of said molding composition.

14. The method of claim 5, 11 or 12 wherein petroleum jelly is included in the carrier and binder component of said molding composition.

15. The method of claim 5, 11 or 12 wherein reinforcement fibers are included in said molding composition in an amount from 5 to 10 weight percent of said composition.

16. The method of claim 5, 11 or 12 wherein a low melting point hydrocarbon wax is included in the carrier and binder component of said molding composition.

17. The method of claim 5, 11 or 12 wherein polyethylene having a density less than 0.9 grams/cubic centimeters is used as the carrier and binder component of said molding composition.

18. The method of claim 14, 15, 16 or 17 wherein said thermoplastic polymer particles are high density polyethylene particles.

19. The method of claim 14, 15, 16 or 17 wherein said thermoplastic polymer particles are ultra high density polyethylene particles.

* * * * *